(12) United States Patent
Hulick et al.

(10) Patent No.: US 6,462,941 B1
(45) Date of Patent: Oct. 8, 2002

(54) METHOD AND APPARATUS FOR BACKLIGHTING A HANDWRITING INPUT AREA FOR A PORTABLE COMPUTING DEVICE

(75) Inventors: Troy Hulick, Saratoga, CA (US); Eric Fuhs, Crystal Lake; John Byrne, Lake Villa, both of IL (US)

(73) Assignee: Palm, Inc., Santa Clara, CA (US)

( * ) Notice: Subject to any disclaimer, the term of this patent is extended or adjusted under 35 U.S.C. 154(b) by 5 days.

(21) Appl. No.: 09/608,596

(22) Filed: Jun. 30, 2000

(51) Int. Cl.[7] .............................. H05K 5/02; H05K 5/00; G06K 9/22
(52) U.S. Cl. ................... 361/683; 361/686; 361/680; 361/681; 345/472.3; 345/169; 345/173
(58) Field of Search .................... 361/680–683, 361/686, 724–727; 345/169–173, 180–183, 25–29, 102, 467–472.3; 348/552, 800, 801, 739, 790

(56) References Cited

U.S. PATENT DOCUMENTS

| | | | | |
|---|---|---|---|---|
| 4,772,769 A | * | 9/1988 | Shumate ...................... 200/314 |
| 4,969,830 A | * | 11/1990 | Daly et al. .................. 200/50.1 |
| 5,164,542 A | * | 11/1992 | Hart ...................... 174/35 MS |
| 5,200,913 A | * | 4/1993 | Hawkins et al. ............. 345/168 |
| 5,267,123 A | * | 11/1993 | Boothroyd et al. ............ 16/361 |
| 5,345,362 A | * | 9/1994 | Winkler ...................... 248/456 |
| 5,375,076 A | * | 12/1994 | Goodrich et al. ............ 361/680 |
| 5,481,430 A | * | 1/1996 | Miyagawa et al. ............ 16/223 |
| 5,506,749 A | * | 4/1996 | Matsuda ...................... 361/683 |
| 5,555,157 A | * | 9/1996 | Moller et al. .............. 312/223.2 |
| 5,579,487 A | * | 11/1996 | Meyerson et al. ........... 361/686 |
| 5,594,619 A | * | 1/1997 | Miyagawa et al. ......... 361/681 |
| 5,644,653 A | * | 7/1997 | Sunakawa et al. .......... 382/187 |
| 5,668,570 A | * | 9/1997 | Ditzik ......................... 248/923 |
| 5,703,625 A | * | 12/1997 | Snider et al. ................ 345/102 |
| 5,747,756 A | * | 5/1998 | Boedecker ................... 200/310 |
| 5,751,547 A | * | 5/1998 | Honda et al. ................ 361/686 |
| 5,926,364 A | * | 7/1999 | Karidis ..................... 312/223.2 |
| 5,940,153 A | * | 8/1999 | Castaneda et al. ............ 349/58 |
| 5,951,349 A | * | 9/1999 | Larose et al. ................ 264/242 |
| 5,995,085 A | * | 11/1999 | Bowen ........................ 345/156 |
| 5,996,956 A | * | 12/1999 | Shawver .................. 248/309.1 |
| 6,020,878 A | * | 2/2000 | Robinson ................... 340/7.26 |

FOREIGN PATENT DOCUMENTS

| | | | | |
|---|---|---|---|---|
| JP | 5-1293494 A | * | 11/1989 | ............ G06M/7/00 |
| JP | 5-289994 A | * | 11/1993 | ............ G06F/15/02 |

* cited by examiner

*Primary Examiner*—Anatoly Vortman
(74) *Attorney, Agent, or Firm*—Wagner, Murabito & Hao LLP

(57) ABSTRACT

A method and apparatus for backlighting a handwriting input area for a portable computing device. The portable computing device includes a display area for displaying alphanumeric data and other images. Underneath the display area is a digitizer input area by which users enter handwritten information into the portable computing device. The portable computing device contains handwriting recognition software which converts the handwritten information into alphanumeric data. Both the display area and the digitizer input area are both backlit to facilitate usage in poor lighting conditions.

24 Claims, 15 Drawing Sheets

60

METHOD AND APPARATUS FOR BACKLIGHTING A HANDWRITING INPUT AREA FOR A PORTABLE COMPUTING DEVICE

BACKGROUND OF THE INVENTION

1. Field of the Invention

The present invention relates to the field of portable computing devices. In particular, the present invention pertains to a method and apparatus for the backlighting of a digitized input area for portable computing devices.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a keyboard device, some palmtop computers utilize a pen and a digitizer pad as an input system. The pen and digitizer pad combination works well for palmtop computers because the arrangement allows a user to hold the palmtop computer system in one hand while writing with the pen onto the digitizer pad with the other hand. A number of palmtop computer systems that rely on the pen and digitizer pad combination as the primary means of input have been introduced to the market. Most of these pen-based palmtop computer systems provide some type of handwriting recognition system whereby the user can write words and letters on the digitizer pad with a stylus. The palmtop computer system then converts the user's handwriting into a machine readable format such as ASCII code characters. Examples of pen-based palmtop computer systems that provide handwriting recognition include the Palm Pilot, the Apple Newton, and the Tandy Zoomer devices.

Although this combination of a display area with a separate digitizer pad input area has proven to be a success in the marketplace, there some drawbacks. One drawback to this configuration is that the prior art designs do not backlight the digitizer pad. In otherwords, the digitizer pad remains in its passive background color. One of the reasons that prior art palmtop computers have failed to backlight the digitizer pad is due to the merging of two hitherto separate functionalities. The display area is typically backlit because it is used to display information to the user. Ones skilled in the display arts recognize the need to backlight displays in order to better portray the displayed images. However, the input digitizer art area has primarily been focused on how best to capture information being input by a user. Since its primary function is as an input device, it was not considered to be part of a display. As with other types of input devices (e.g., keyboard, mouse, joystick, trackball, etc.), it was left as a passive, unlit device.

Unfortunately, because these palmtop computers are intentionally designed to be mobile and portable, they often find use in unlit or poor lighting conditions. It can be quite difficult and frustrating to use a palmtop computer in such darkened or low-light conditions. Due to its perpetually darkened state, there is no visual cue being fed back to the user. Consequently, in these low-light environments, it can be quite challenging or even impossible to input data via the unlit digitizer pad. In many instances, this defeats the purpose of even carrying around a palmtop computers and dramatically lessens their overall usefulness and appeal. Thus, there is a need in the prior art for providing a solution to this problem.

SUMMARY OF THE INVENTION

The present invention pertains to a method and apparatus for backlighting a handwriting input area for a portable computing device. The portable computing device includes a display area for displaying alphanumeric data and other images. Underneath the display area is a digitizer input area by which users enter handwritten information into the portable computing device. The portable computing device contains handwriting recognition software which converts the handwritten information into alphanumeric data. Both the display area and the digitizer input area are both backlit to facilitate usage in poor lighting conditions. And even under well-lit conditions, it may be more visually appealing, gratifying, and stimulating to backlight the digitizer input area.

DETAILED DESCRIPTION OF THE INVENTION

In the following detailed description of the present invention, a method and system providing improved handwriting recognition for a computer system that backlights a handwriting in put area, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

NEXT-STROKE PREDICTION IN ACCORDANCE WITH THE PRESENT INVENTION

Figure 1:
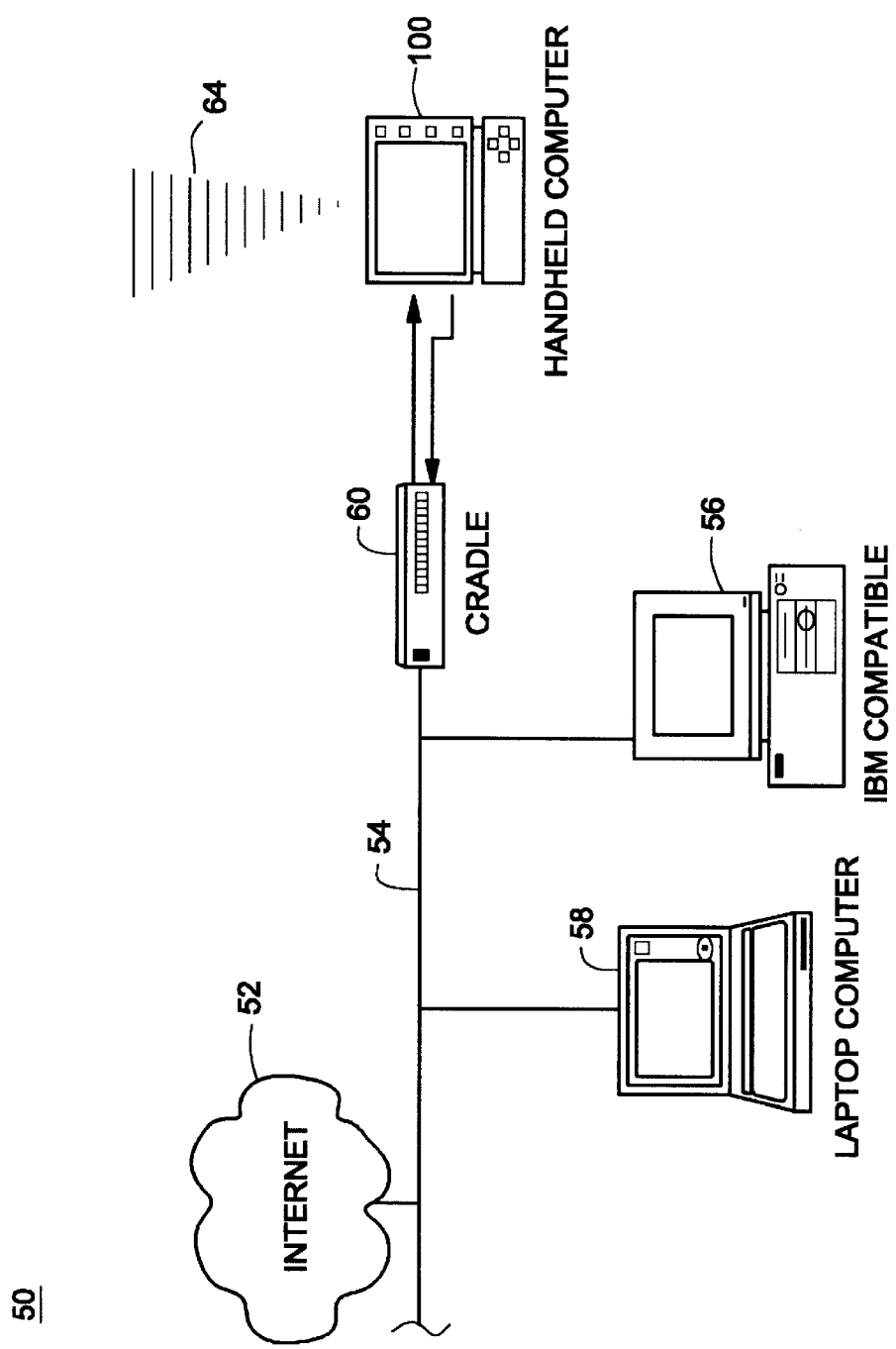
FIG. 1 is system illustration of a palmtop computer system connected to other computer systems and the Internet via a cradle device.

FIG. 1 illustrates a system 50 that can be used in conjunction with the next-stroke prediction data entry system of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
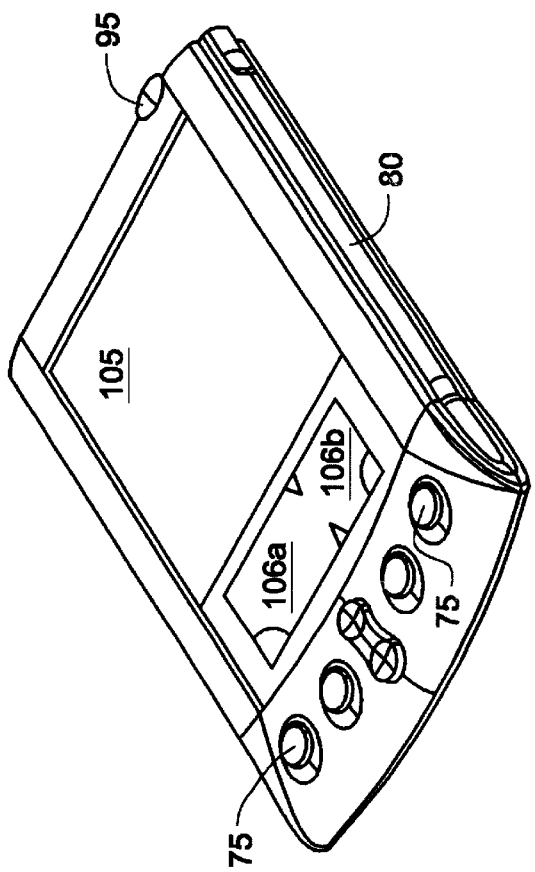
FIG. 2A is a top side perspective view of a palmtop computer system that can be used as a platform for the data entry embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

Importantly, FIG. 2A also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
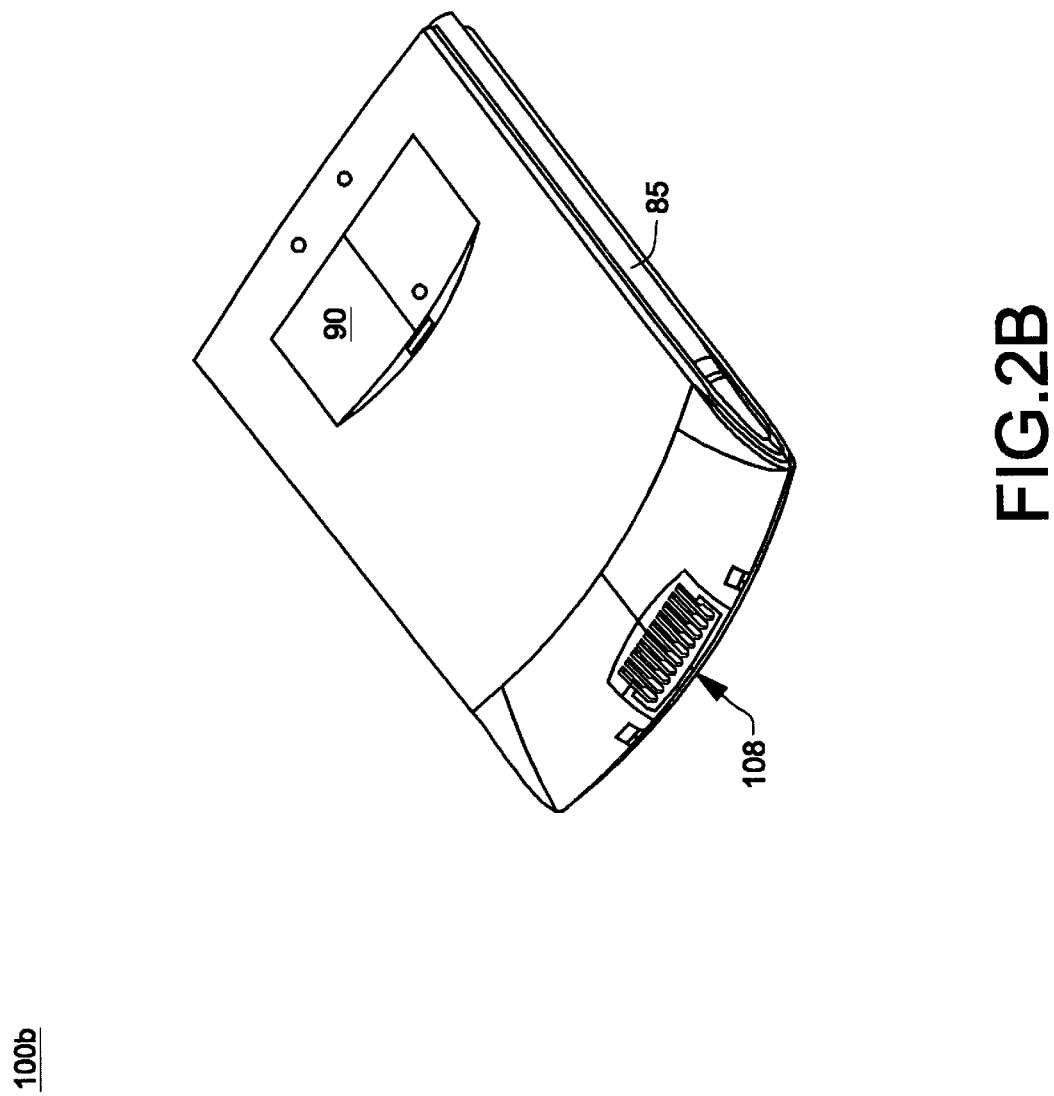
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
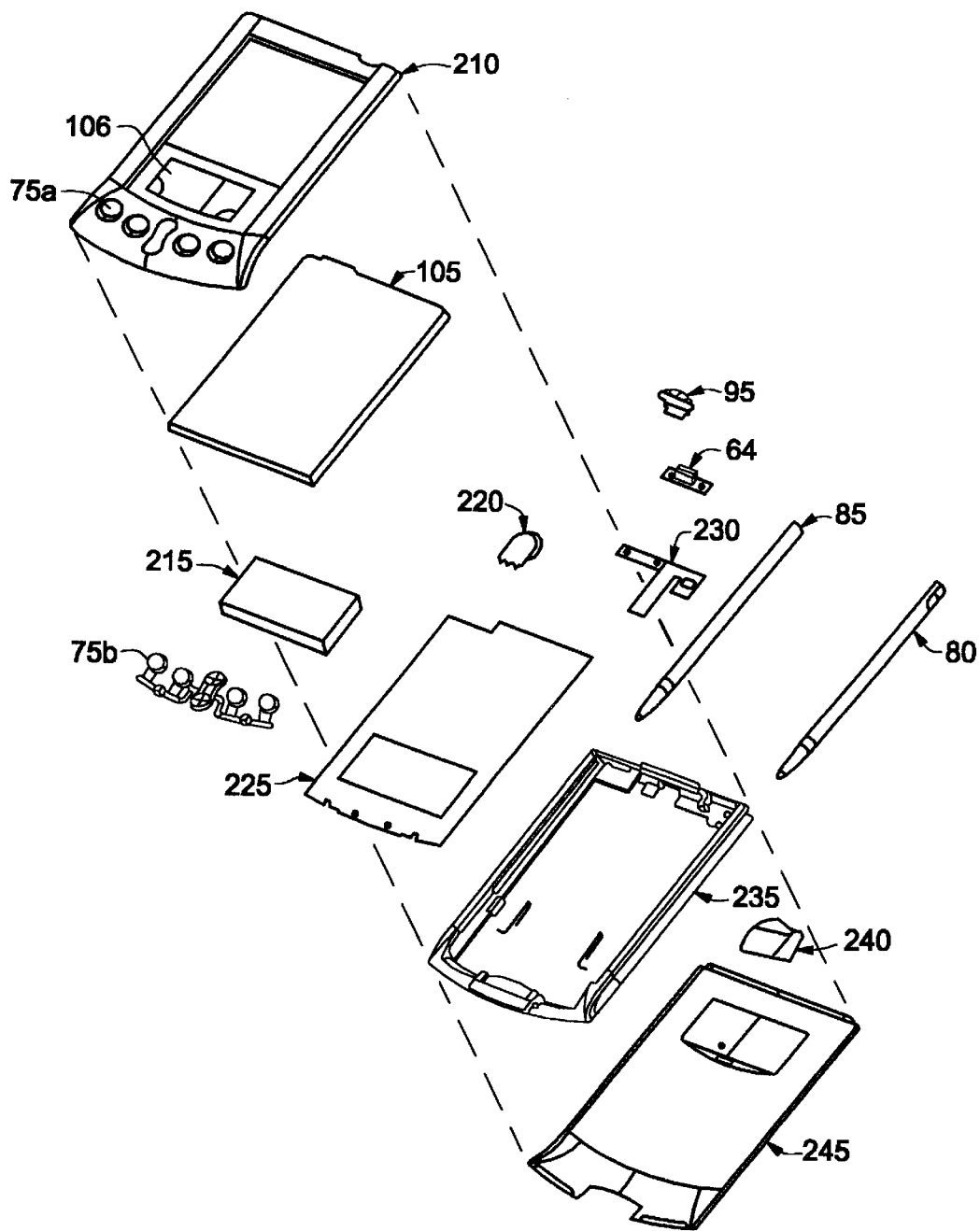
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
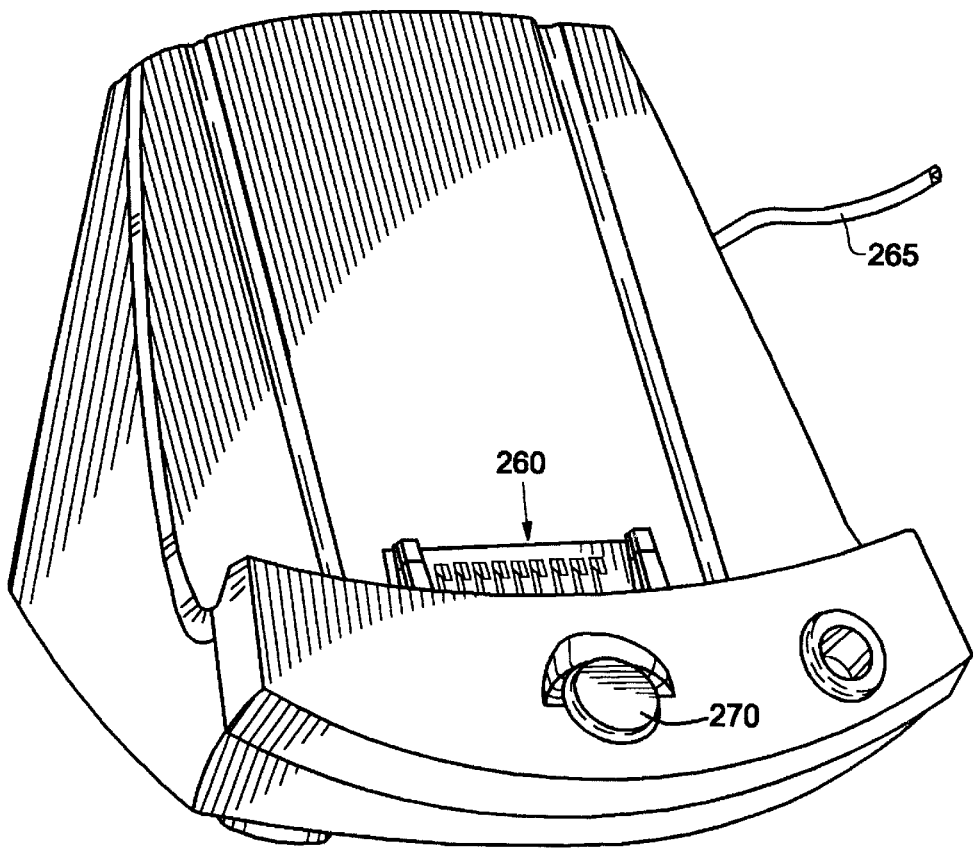
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
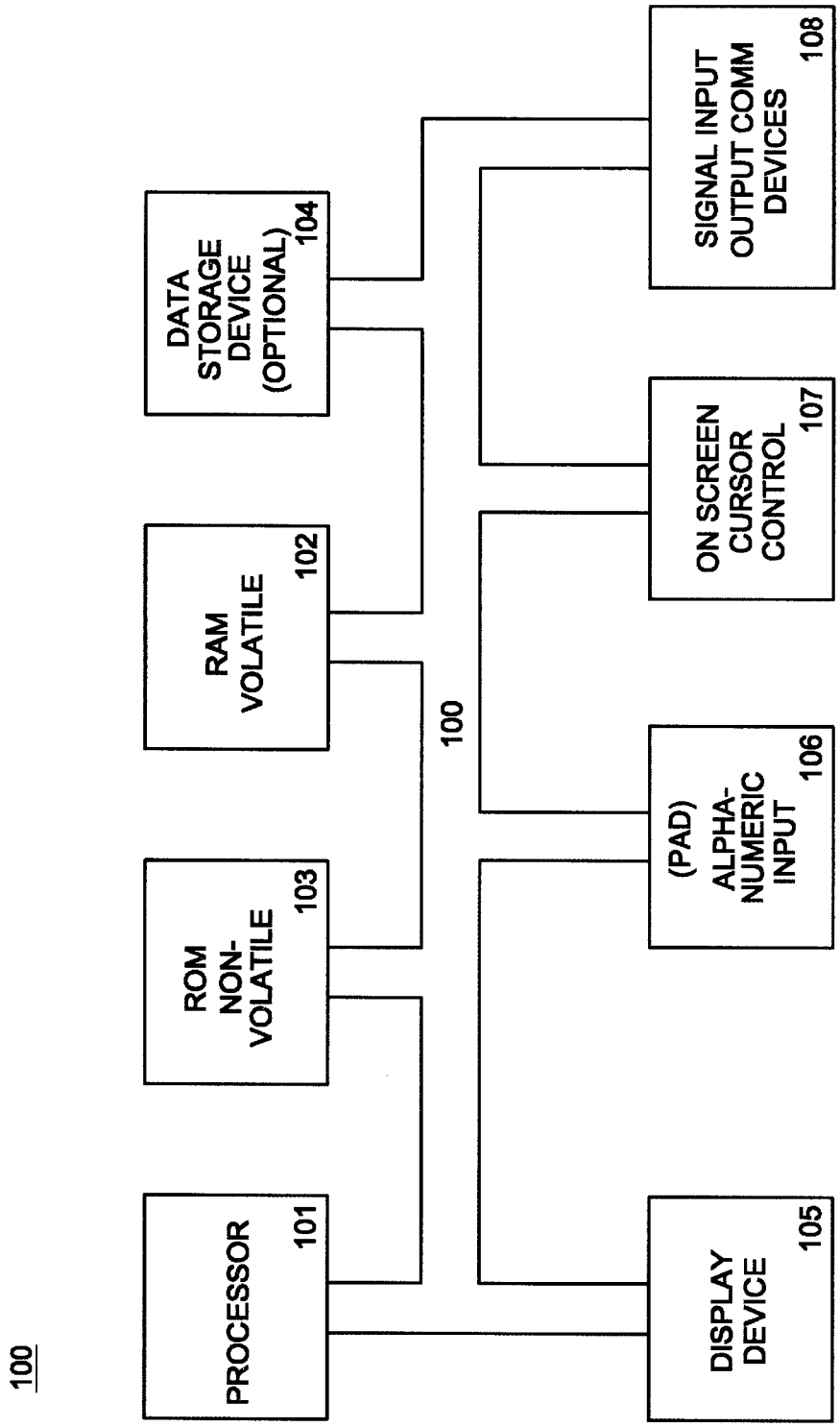
FIG. 5 is a logical block diagram of the palmtop computer system in accordance with an embodiment of the present invention.

FIG. 5 illustrates circuitry of computer system 100, some of which can be implemented on PC board 225. The computer system 100 can be used to perform handwriting recognition processes of the present invention, e.g., process 500 (FIG. 11A and FIG. 11B) and process 600 (FIG. 12A and FIG. 12B). Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display. Signal communication device 108, also coupled to bus 100, can be a serial port for communicating with the cradle 60. Device 108 can also include an infrared communication port.

Figure 6:
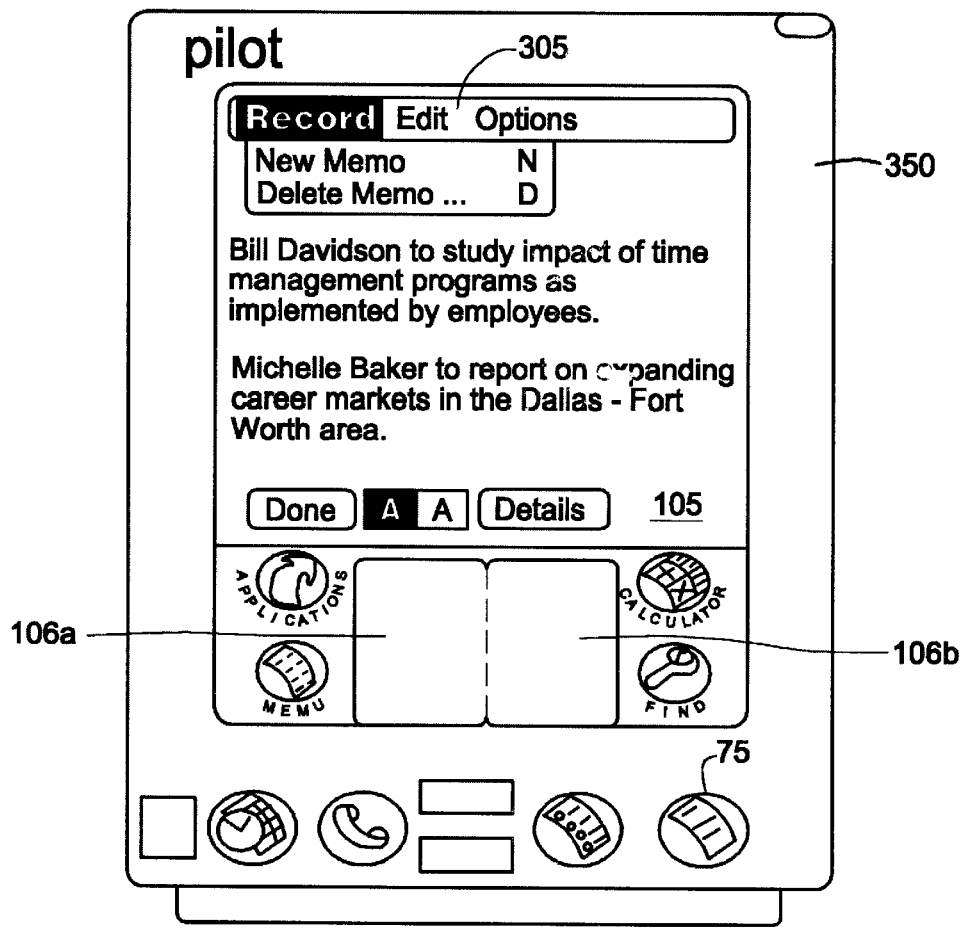
FIG. 6 is a front view of a palm top computer system illustrating the display screen, digitizer regions and an exemplary menu in accordance with the present invention.

FIG. 6 is a front view of the palmtop computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. In the currently preferred embodiment of the present invention, these two digitizer regions 106a and 106b are backlit. In other words, lighting is provided to shine through these two regions. Physical buttons 75 are also shown. In one embodiment, these physical buttons 75 are also backlit. Although different regions are shown for alphabetic and numeric characters, the present invention is also operable within a single region that recognizes both alphabetic and numeric characters. Again, such a combined region would be backlit. Furthermore, artwork 320 and 325 can also be backlit.

Figure 7:
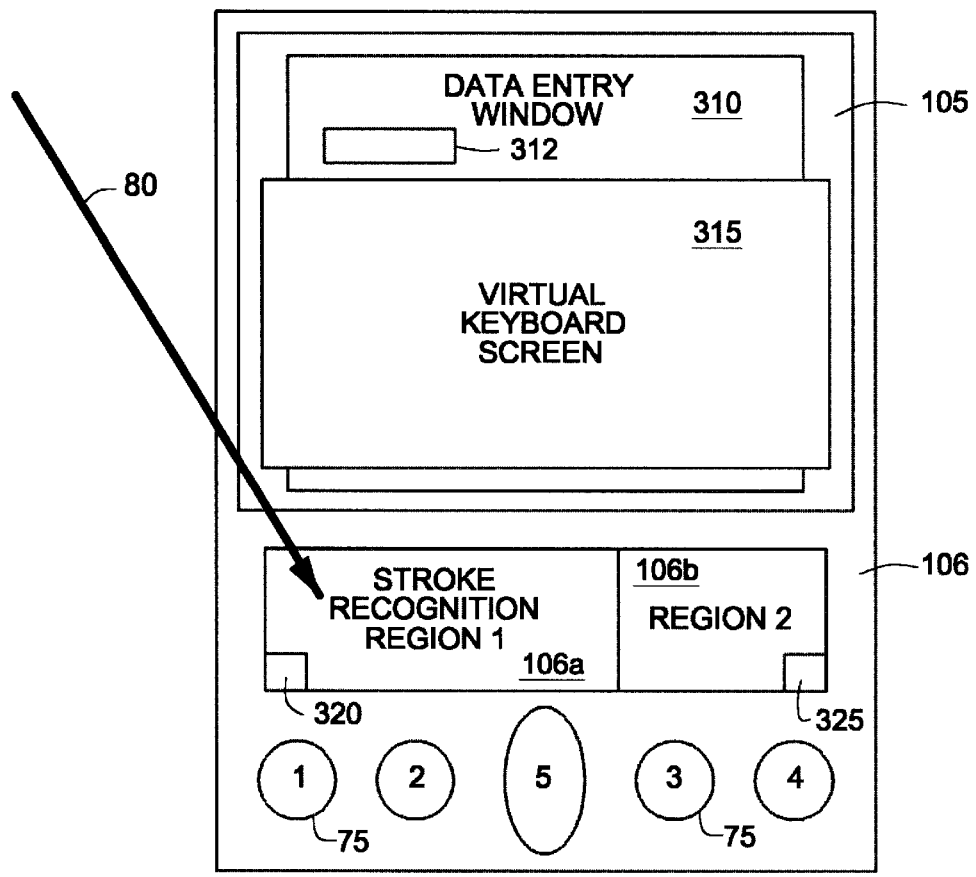
FIG. 7 illustrates a display screen showing a data entry window and a virtual keyboard window and also illustrates a handwriting recognition digitizer on the palmtop computer system in accordance with embodiments the present invention.

FIG. 7 is a front view of the palmtop computer system 100 with several display windows open on screen 105 including a virtual keyboard window 315. The user has the choice of displaying a virtual keyboard image on display 105 and entering characters by selecting one of the displayed characters of the virtual keyboard image. Window 310 is part of a generic application program executing on system 100. Window 310 is a data entry window in that the application program is requesting information to be entered by a user. The information requested and the application program could be any information and any program. Typically, data entry window 310 has at least one data entry field 312 for accepting character data therein. When not entering data using the virtual keyboard 315, the user can stroke a character within pad 106 (either region 106a or 106b). The recognized character is then also placed into the displayed data entry field for user verification and use. This process can be repeated. It is appreciated that the digitizer regions 106a and 106b is separate from the display screen 105 and therefore does not consume any display area. In the currently preferred embodiment, the data entry window 310, virtual keyboard screen 315, stroke recognition region 106a, and numeric entry region 106b are all backlit. Furthermore, keys 75 can also be backlit.

Figure 8:
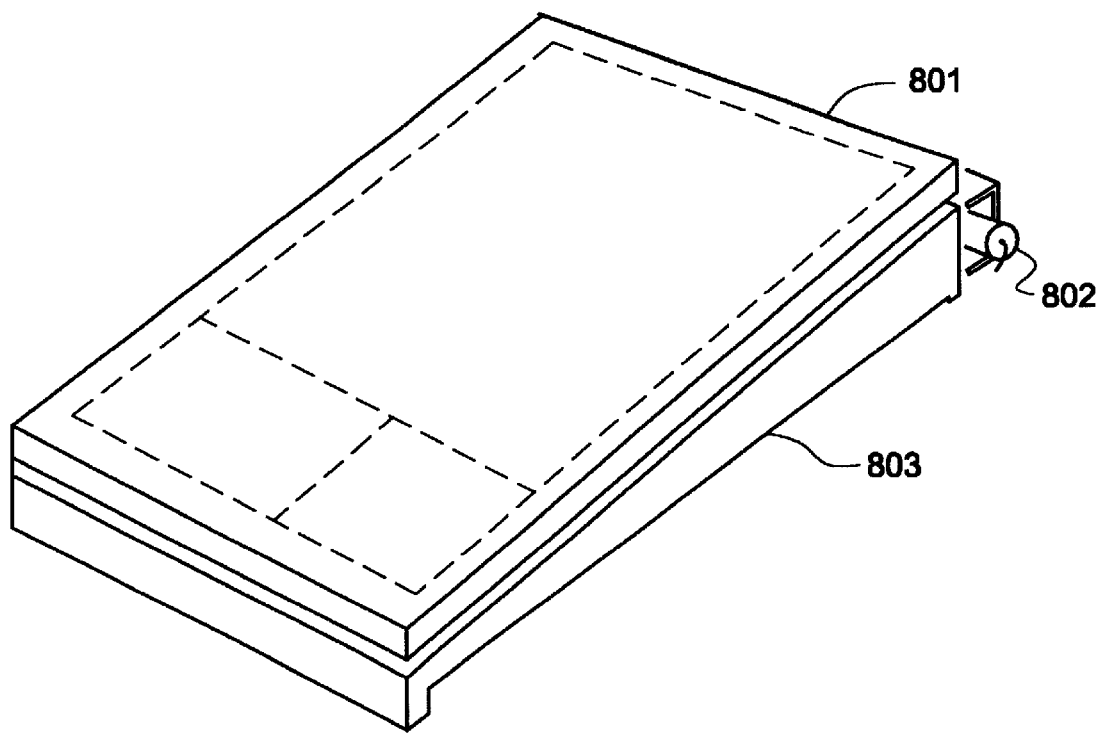
FIG. 8 shows an exploded objective view of a palmtop computing device having a backlit digitizer including a backlit display and backlit input areas.

FIG. 8 shows an exploded objective view of a palmtop computing device having a backlit digitizer including a backlit display and backlit input areas. The display area displays information to the user. The input area is sometimes referred to as the "graffiti" area. This area is used to input handwritten information (e.g., via a stylus). In this embodiment, the digitizer 801 is overlaid on top of a lightpipe 803. Lightpipe 803 is a rectangular piece of material used to conduct light. Lightpipe 803 is approximately the same size, shape, and form factor as that of the digitizer 801. Lightpipe 803 is used to conduct the light from a lightsource 802 and reflect that light evenly upwards through the transparent digitizer 801. Light source 302 can be a light emitting diode (LED) or a cold cathode fluorescent light (CCFL). Light shining from light source 802 is reflected via a series of sawtoothed indentations of lightpipe 803 such that the light is evenly distributed to backlight the digitizer 801. It should be noted that the light source 802 can be placed on any of the four sides of the lightpipe 803.

Figure 9:
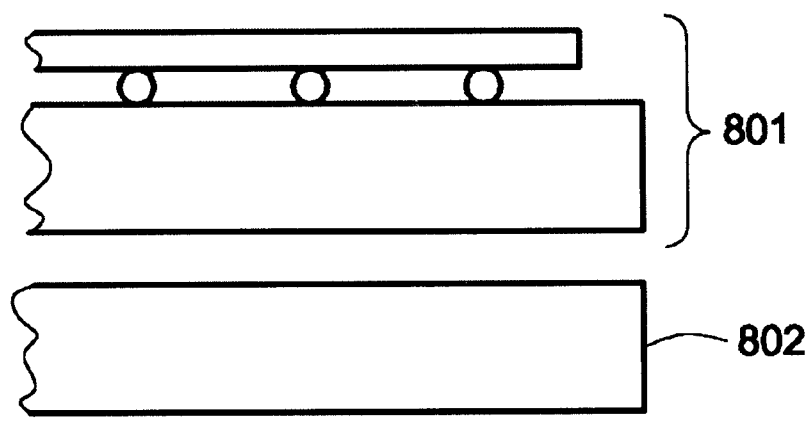
FIG. 9 shows a side view of the digitizer and lightpipe in accordance with an embodiment of the present invention.

FIG. 9 shows a side view of the digitizer 801 and lightpipe 802. It can be seen that the digitizer 801 is overlaid on top of the lightpipe 802. Thereby, light reflects from lightpipe 802 and emanates through the digitizer 801. Characters, artwork, or other types of images are thereby backlit by the light shining from the lightpipe 802 through digitizer 801.

Figure 10:
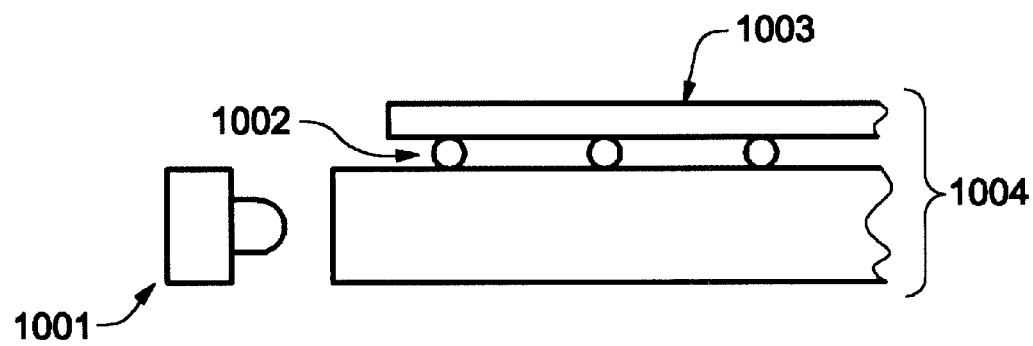
FIG. 10 shows an alternative embodiment of the present invention where the digitizer and lightpipe are combined into a single piece.

FIG. 10 shows an alternative embodiment of the present invention. In this embodiment, the digitizer and lightpipe are combined as a single piece 1004. The light source 1001 is used to provide light to the combined digitizer/lightpipe 1004. One or more films, coatings, and/or coverings 1003 can be overlaid on top of the digitizer/lightpipe 1004. A touch panel spacer 1002 is used to separate the film 1003 from the digitizer/lightpipe 1004. This embodiment is preferable because it reduces the overall thickness of the palmtop computing device.

Figure 11:
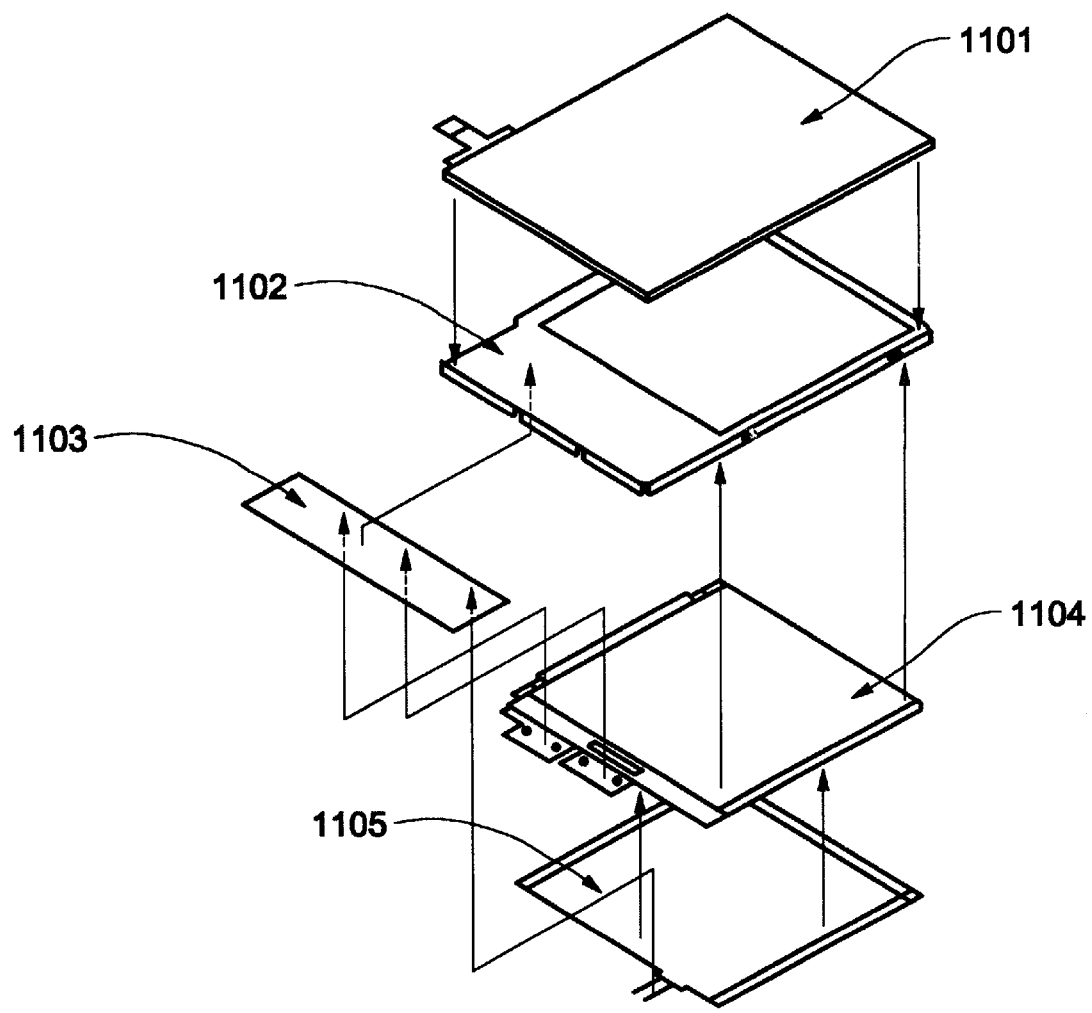
FIG. 11 shows an exploded view of an exemplary module assembly for practicing the present invention.

FIG. 11 shows an exploded view of an exemplary module for practicing the present invention. The module assembly is comprised of a touch panel 1101 as the top-most layer. Residing underneath the touch panel 1101 is a bezel 1102. A printed circuit board containing the semiconductor chips and other electronic components is shown as 1103. Next, a LCD panel 1104 is used for display purposes. Finally, a backlight element 1105 is used to provide the backlighting. In one embodiment, the backlight element 1105 is comprised of an electro-luminescent (EL) material. The backlight element 1105 extends to cover both the display area as well as the input digitizer area(s). The backlight element 1105 can also be extended to cover any other areas, such as keys, logos, artwork, jacks, plugs, adapters, interfaces, menus, prompts, icons, security features, etc.

Figure 12:
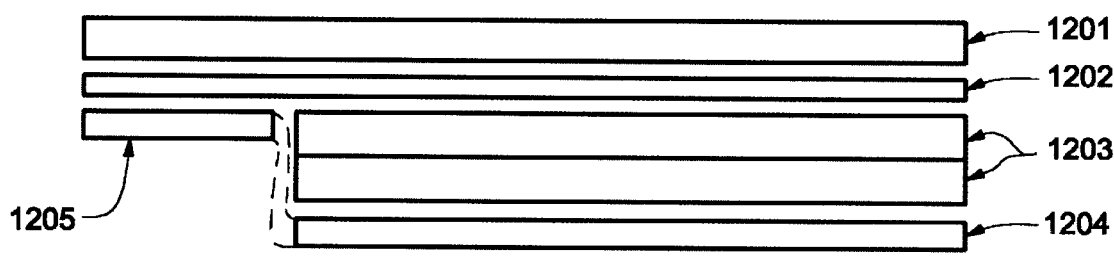
FIG. 12 shows a side view of a palmtop computing device having a backlit digitizer input area.

FIG. 12 shows a side view of a palmtop computing device having a backlit digitizer input area. The digitizer layer is shown as 1201. This digitizer layer includes both a display area as well as an area whereby the user inputs handwritten information (e.g., alphanumeric). A graphics layer 1202 is used to provide any graphics which the manufacturer desires to display to the user. Next, a display layer 1203 is used to display information to the user. Underneath the display layer 1203 is the backlight layer 1204. The backlight layer 1204 can be a lightpipe to an electroluminescent (EL) layer. Furthermore, backlight layer 1204 can be fashioned from a single piece and bent to conform to the requisite form factor (as shown by the dashed lines), or it can be fashioned as two separate pieces. A separate backlighting piece 1205 can be dedicated to backlight the input digitizer area (e.g., the graffiti area).

Figure 13:
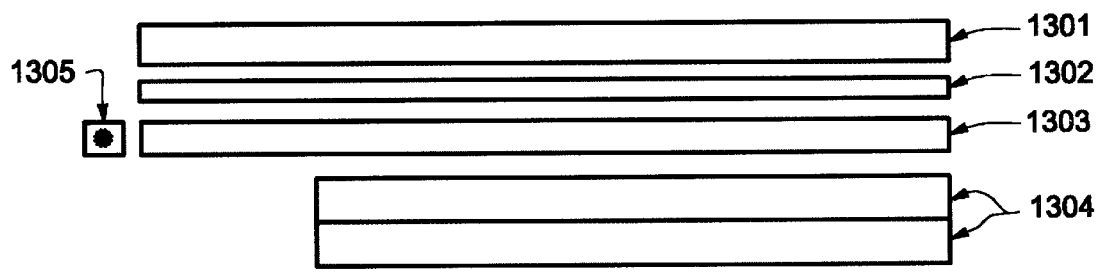
FIG. 13 shows a side view of an alternative embodiment of a palmtop computing device having a backlit digitizer input area.

FIG. 13 shows a side view of an alternative embodiment of a palmtop computing device having a backlit digitizer input area. In this embodiment, the various layers are arranged in a different configuration. The digitizer layer 1301 is the top-most layer. However, the graphics layer 1302 resides directly underneath the digitizer layer 1301. Next comes the backlighting layer 1303. Backlighting layer 1303 extends the full length of the digitizer layer 1301. Thereby, backlighting is provided to the display as well as input areas, including the handwriting recognition area. A light source 1305, such as a LED or CCFL can be used. In one embodiment different or contrasting colors can be used to provide the background lighting. For example one color can be used for the display area whereas a different color can highlight the input area. Alternatively, different light intensities for display as well as backlighting can be provided for select areas viewable by the user. It should be noted that there exist any number of different ways by which the present invention may be physically implemented.

Figure 14:
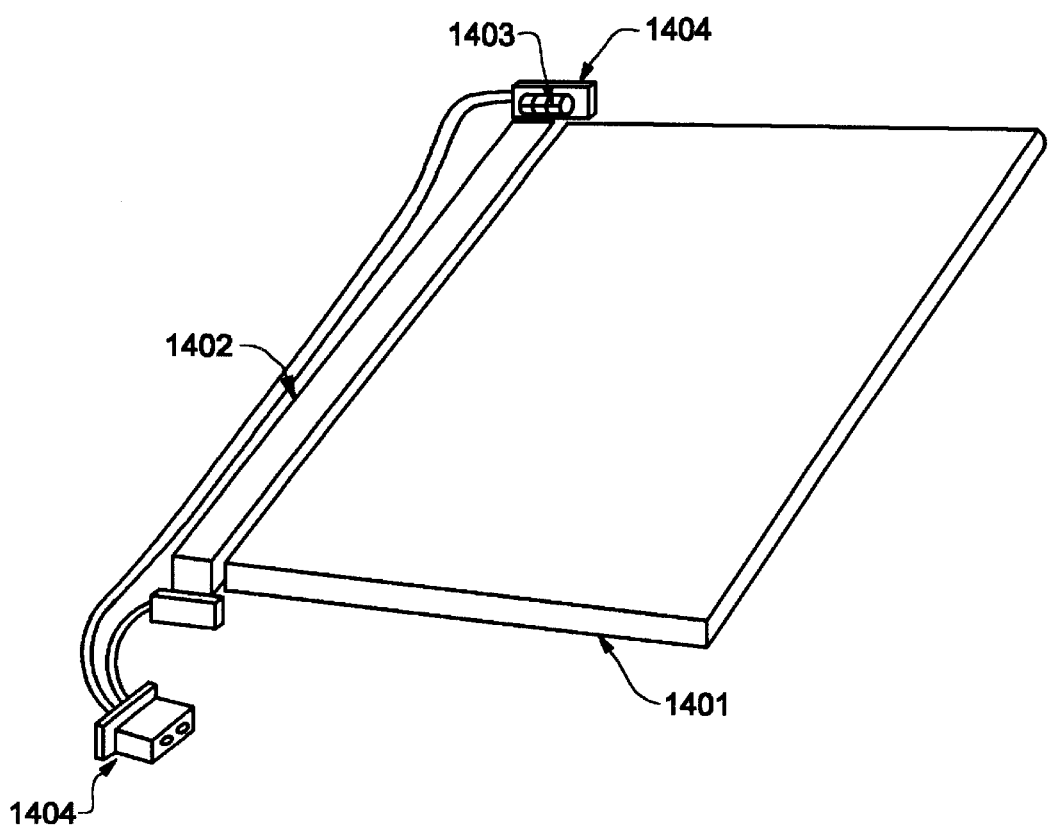
FIG. 14 shows a detailed diagram of an exemplary lightpipe assembly which can be used to practice the present invention.

FIG. 14 shows a detailed diagram of an exemplary lightpipe assembly which may be used to practice the present invention. The actual lightpipe is shown as a rectangular piece of material 1401. The lightpipe 1401 is optically coupled to receive light from a phosphorous light pipe corridor 1402. In turn, the phosphorous light pipe corridor 1402 derives its lighting from LEDs 1403. An LED printed circuit board 1404 is used to drive the LEDs 1403. A similar LED and LED PCB arrangement is found at the opposite end of the lightpipe corridor 1402. Lastly, a connector 1404 electrically connects the lightpipe assembly to the display driver board.

Therefore, a method and apparatus for the backlighting of a digitized input area for portable computing devices has been disclosed. While the present invention has been described in particular embodiments, it should be appreciated that the present invention should not be construed as limited by such embodiments, but rather construed according to the below claims.

What is claimed is:

1. A portable computing device, comprising:
   a display area for displaying images;
   an input area, located in proximity to the display area such that the display area and input area do not coincide, for entering handwritten information to the portable computing device;
   a processor which runs handwriting recognition software to recognize the handwritten information input by a user;
   a memory coupled to the processor for storing the handwriting recognition software; and
   a lightpipe which provides backlighting to the input area.

2. The portable computing device of claim 1, wherein the lightpipe accepts light emanating from a light emitting diode.

3. The portable computing device of claim 1, wherein the lightpipe accepts light emanating from a cold cathode fluorescent light.

4. The portable computing device of claim 1, wherein the input area is comprised of a first area for inputting alphabets and a second area for inputting numerics.

5. The portable computing device of claim 1 further comprising backlit keys.

6. The portable computing device of claim 1, wherein the lightpipe also provides backlighting to the display area.

7. The portable computing device of claim 1, further comprising a single layer which performs both functions of input and backlighting.

8. A method of providing backlighting in a portable computing device, comprising the steps of:
   recognizing handwritten information entered into an input area of the portable computing device;
   displaying images in a display area, wherein the display area is located in proximity to the input area such that the display area and input area do not coincide;
   illuminating the portable computing device, wherein both the display area and the input area are both backlit by a lightpipe.

9. The method of claim 8, wherein the lightpipe accepts light emanating from a light emitting diode.

10. The method of claim 8, wherein the lightpipe accepts light emanating from a cold cathode fluorescent light.

11. The method of claim 8, wherein the input area is comprised of a first area for inputting alphabets and a second area for inputting numerics.

12. The method of claim 8 further comprising the step of backlighting keys.

13. The method of claim 8, wherein a same lightpipe backlights both the display area and the input area.

14. The method of claim 13, further comprising the step of integrating a digitizer with the lightpipe to illuminate both the display area and the input area.

15. A portable computing device, comprising:
   a display area for displaying images;
   an input area, located in proximity to the display area such that the display area and the input area do not coincide;
   a digitizer, located in proximity to the display area and the input area such that a first portion of the digitizer coincides with the display area and a second portion of the digitizer coincides with the input area, for entering handwritten information in the input area and for entering information in the display area, for input to the portable computing device;

a processor which runs handwriting recognition software to recognize the handwritten information input by a user;

a memory coupled to the processor for storing the handwriting recognition software; and a lightpipe which provides backlighting to the input area.

16. The portable computing device of claim 15, wherein the lightpipe accepts light emanating from a light emitting diode.

17. The portable computing device of claim 15, wherein the lightpipe accepts light emanating from a cold cathode fluorescent light.

18. The portable computing device of claim 15, wherein the input area is comprised of a first area for inputting alphabets and a second area for imputing numerics.

19. The portable computing device of claim 15, further comprising backlit keys for controlling the portable computing device.

20. The portable computing device of claim 15, wherein the lightpipe also provides backlighting to the display area.

21. The portable computing device of claim 15, wherein the digitizer and the lightpipe comprise an integrated assembly.

22. The portable computing device of claim 15, wherein the digitizer overlays the display area and the input area.

23. The portable computing device of claim 22, wherein the display area overlays the lightpipe.

24. The portable computing device of claim 22, further comprising a graphics layer, whereby the graphics layer underlies the digitizer and overlays the display area and the input area.

* * * * *